United States Patent [19]

Kraft et al.

[11] 4,174,159

[45] Nov. 13, 1979

[54] EXPOSURE METER FOR PHOTOMICROGRAPHY

[75] Inventors: Winfried Kraft, Werdorf; Günter Reinheimer, Biebertal; Herbert Leiter, Wetzlar, all of Fed. Rep. of Germany

[73] Assignee: Ernst Leitz Wetzlar GmbH, Wetzlar, Fed. Rep. of Germany

[21] Appl. No.: 895,477

[22] Filed: Apr. 11, 1978

[30] Foreign Application Priority Data

Apr. 18, 1977 [DE] Fed. Rep. of Germany ....... 2717033

[51] Int. Cl.² .................... G02B 21/00; G03B 17/48; G03B 7/08
[52] U.S. Cl. .................................. 354/23 R; 350/19; 354/79
[58] Field of Search ................... 354/126, 23, 79; 350/18, 19

[56] References Cited

U.S. PATENT DOCUMENTS

| | | | |
|---|---|---|---|
| 3,106,129 | 10/1963 | Frenk et al. | 350/19 X |
| 3,130,634 | 4/1964 | Kropp et al. | 350/19 X |
| 3,851,949 | 12/1974 | Kraft et al. | 350/18 |

FOREIGN PATENT DOCUMENTS 1164241  9/1969  United Kingdom ................ 350/18

Primary Examiner—Donald A. Griffin
Attorney, Agent, or Firm—Gilbert L. Wells

[57] ABSTRACT

Photomicrographic exposure meter for cameras attached to microscopes in which part of the picture-taking beam is reflected by means of a beam-splitter and where the reflected beam part projects an image of the object onto an image plane, measuring field stop is located in the image plane with an aperture for detail or spot measurements and an insertable photo-electric detector cooperates therewith downstream of the stop in the direction of light.

The beam part is reflected by at least one specular means (12,61) to the measuring field stop (13). The stop is gimbal-suspended and means are provided both for displacing the gimbal-suspended specular means (12,61) and for viewing the object detail appearing in the stop aperture.

15 Claims, 6 Drawing Figures

EXPOSURE METER FOR PHOTOMICROGRAPHY

CROSS-REFERENCE TO A RELATED APPLICATION

Applicants claim priority under 35 USC 119 for application P 2717 033.8 filed Apr. 18, 1977 in the Patent Office of the Federal Republic of Germany.

BACKGROUND OF THE INVENTION

The field of the present invention is apparatus for measuring the brightness of an object and the present invention is particularly related to determining the exposure time of a photomicrographic apparatus.

It is known with respect to such an apparatus to tap part of the beam from the object to the film for visual observation and it is further more known to use an additional part of the beam for exposure metering as disclosed in U.S. Pat. No. 3,851,949, the disclosure of which is incorporated herein.

Such exposure-metering can be carried out using several methods. For instance an intermediary lens may be used to project the exit pupil of the objective through a beam splitter into an auxiliary plane in which is located a photoelectric detector feeding an output signal corresponding to the object brightness to a display device, or, if automatic control is desired, directly to the shutter control. However, the object itself may be projected through a beam splitter onto a plane in which again a photoelectric detector is located.

Particularly as regards the last case, the measuring system may be such as to allow switching from measuring the entire object image (integrated measurement) to measuring only part of the image (detailed or spot measurement) and vice versa by the introduction of different stops. Because the detail or spot important to the image however is located at the center of the object image only in exceptional cases, the suggestion already has been advanced to render the stop used to localize the image detail spatially variable, whereby its small aperture is practically moved to any location of the image, so that only light from this detail or spot reaches the photo detector and the remainder of the object, i.e. of its image, remains masked by the stop. On the other hand it is obviously also possible to mount the stop in place permanently and to displace the object until the desired detail appears at the aperture of this stop. This is already known from U.S. Pat. No. 3,106,129, but, compared to the spatially variable measuring field stop, it is cumbersome and hence disadvantageous.

However, there are also drawbacks in using a spatially variable measuring field stop considering that a relatively large space is required for the displacement of the stop and that both the optical and mechanical construction costs of displacing it are large.

SUMMARY OF THE INVENTION

Having in mind the limitations of the prior art, it is an object of the present invention to provide a photomicrographic measuring instrument requiring neither the large bulk nor the high optical and mechanical construction costs, and nevertheless allowing detail or spot measurements without requiring the laborious displacement of the object.

The present invention achieves this object in that a tapped, partial beam used for exposure measurement is deflected by at least one specular means to the measuring field stop which is suspended in gimbals and means are provided both for displacing the gimbal-suspended specular means and for observing the object detail appearing in the stop aperture.

Whereas the measurement methods according to the state of the prior art either keep the stop fixed in position, displacing the object until the desired detail appears in the stop aperture, or keep the object fixed in position, the stop with its aperture being displaced until reaching the important object detail, the implementation of the present invention keeps both the object and the measuring field stop fixed in position. It is merely the image of the object which is displaced using the gimbal-suspended means, so that the image of the important object detail becomes visible to the photo-detector through the aperture of the measuring field stop serving for the detail or spot measurement. The gimbal-suspended reflecting means may be either the beam-splitter itself, tapping the measuring beam from the picture-taking beam, or this beam-splitter may be fixed in position and instead another deflecting mirror may be located in the path of the measuring beam and be gimbal-suspended.

The manner in which the gimbal-suspended specular means pivots, and hence the ways in which the image of the object is displaced into the measuring field stop, is without significance per se. This may be achieved for instance by a manually actuated drive. But it is especially recommended that electrical adjustment means (motors) be used, which in turn might be controlled from a micro-processor.

In order to reliably gather the significant image detail or spot into the stop aperture when performing detail or spot measurements, the adjustment process obviously must be monitored. It is proposed therefore to mount a reflex mirror behind the measuring field stop and to use this reflex mirror to observe the stop aperture when the photo-electric detector is removed from the path of the beam.

In a preferred embodiment of the present invention, the reflex mirror and the photo-detector are integrated in a special displacement unit whereby either the reflex mirror or the photo-detector is located in the path of the beam depending on the position of the displacement unit. This displacement unit then is provided with the two fixed positions "observe" and "measure" between which it can be moved.

Especially when a microprocessor is used to control the electrical adjustment devices for the gimbal-suspended specular means, there is the further possibility of using a luminous display for the sighting of the object detail appearing in the stop aperture, in the form of a bright spot moving across the image field being observed by the user. The motion of the gimbal-suspended reflecting means and that of the bright spot across the image field then merely require proportional control from the micro-processor.

It is also possible to provide in a manner known per se the measuring field stop itself as the displacing unit and to add a second, larger aperture for integrated measurements to the stop aperture for the detail or spot measurement. The measuring field stop in that case also can be moved between two fixed positions, so that in one of them detail or spot measurements may be performed, and in the other integrated measurements, the deflecting mirror assuming a middle position in the latter case.

When the measuring field stop is designed as a displacement unit in this manner, there arises however the inconvenience of only seeing that small spot passed through by the stop aperture when viewing prior to a detail or spot measurement, the position of this spot or detail within the overall objective however not being revealed. It is proposed further therefore that a transparent support be rigidly connected to the stop displacing means and to provide it with a marking the size of the stop. This support then must be moved in the path of the beam during observation, whereby an overall view of the object is retained.

Such an overall view of the object also is retained in an embodiment further proposed, in which a sideways illuminated mirror is mounted above the measuring field stop and between same and the photo-detector at an angle of about 45°, this illuminated mirror being in operational position during the viewing process and reflecting an image of the stop aperture into the binocular tube, further requiring a triple reflector as will be explained below.

In order to adapt the stop for detail or spot measurements to the shape of the particular important detail of the image, it is further proposed to make this stop variable in shape and in size. This stop, or its aperture, therefore is not necessarily always circular, but may assume a rectangular, oval, elongated or other suitable shape and size by adjustment.

In a particular embodiment, the size of the stop may be varied by inserting a zoom lens into the path of the measuring beam. In such a case the stop need not be a movable unit, rather it can be fixed in position.

The size of the stop is determined by manually or automatically inserted calibration factors when performing exposure measurements.

BRIEF DESCRIPTION OF THE DRAWINGS

The embodiments of the present invention may best be described by reference to the drawings appended hereto, wherein.

DESCRIPTION OF THE PREFERRED EMBODIMENTS

Figure 1:
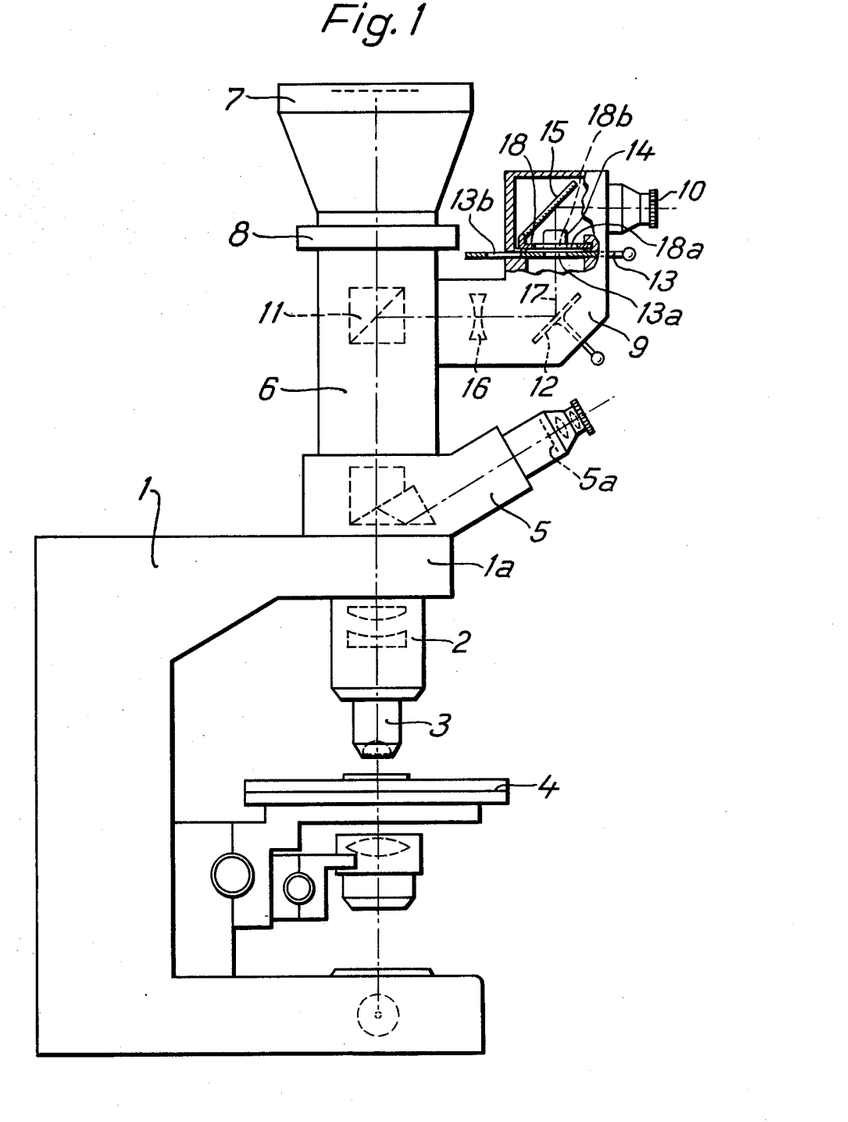
FIG. 1 is a schematic showing in side view of a microscope with the apparatus of the present invention.

With particular reference to FIG. 1, the stand 1 of a microscope is shown which comprises essentially a tube 2 with objective 3 and a stage 4.

The microscope stand 1 comprises a horizontal support 1a on which rests, on the viewer side, a slanted ocular 5. A further tube 6 rises above the support, holding an attachment camera 7 with shutter 8 inserted between the tube and camera.

An exposure meter 9 is mounted to tube 6 above ocular 5, which has its own ocular 10.

A beam-splitter 11 is mounted inside tube 6, deflecting rays from objective 3 into meter 9. The essential functional parts of meter 9 are most clearly shown in FIG. 2. They consist of a gimbal or universal-joint supported deflection mirror 12, a displacement unit 13 incorporating the field measuring stops, a photo-electric detector 14, a reflex mirror 15 and the ocular 10 previously mentioned. In addition there is a lens system 16 projecting an image of the object into the plane of the measuring field stop 13.

Figure 2:
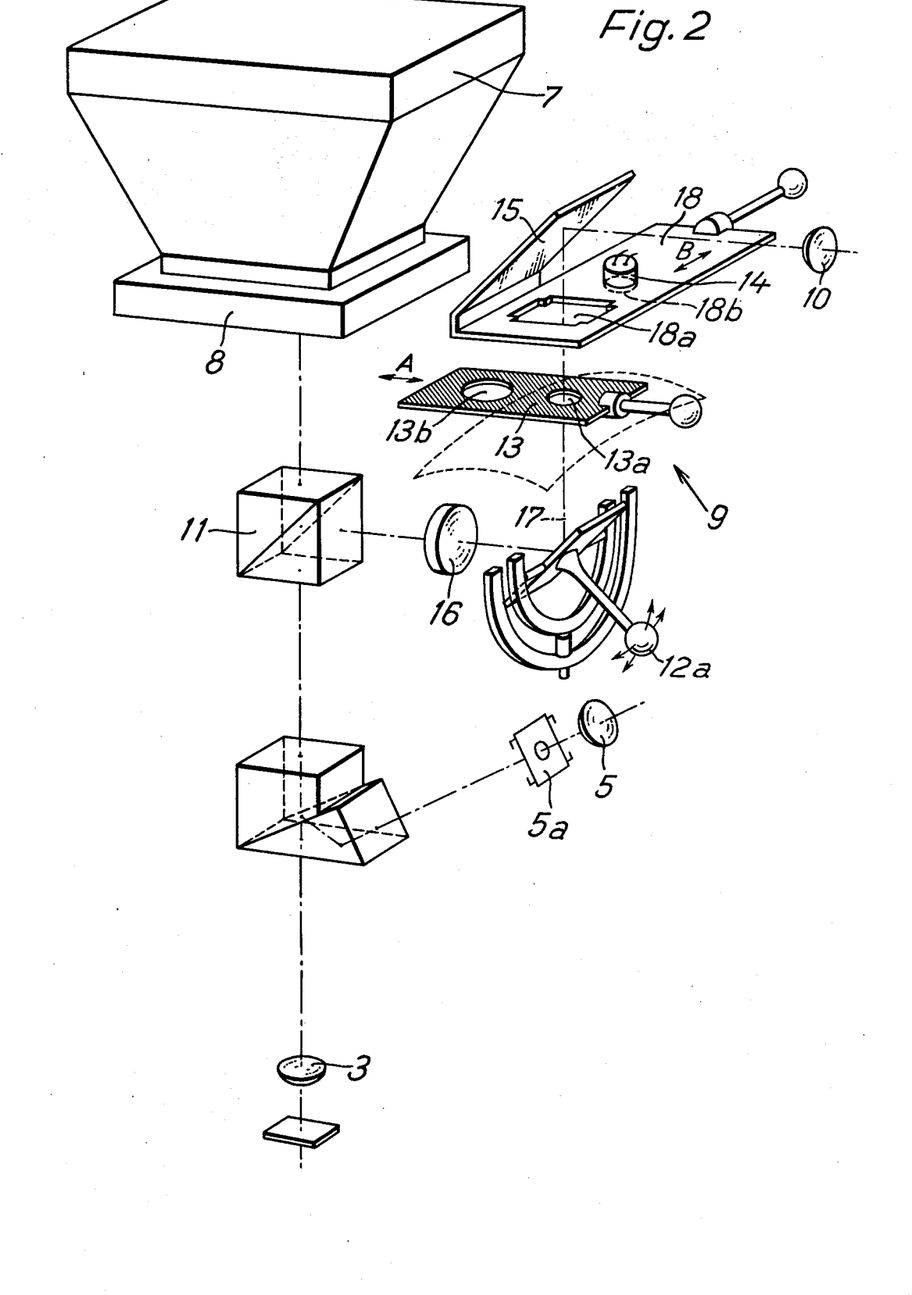
FIG. 2 is a perspective showing of the apparatus of the present invention, in detail, with a beam-splitter fixed in position and a gimbal-suspended deflection mirror.

The displacement unit for the measuring field stops is slider 13 with a small stop 13a for the detail or spot measurement and a large stop 13b for the integrated measurements. The displacement unit for the measuring field stops may be moved in the direction of double arrow A so that either stop 13a or stop 13b is aligned with optical axis 17.

Photo-detector 14 and reflex-mirror 15 are similarly consolidated on a common slider 18 into one constructional unit. This slider 18 also is provided with two apertures 18a and 18b and can be moved in the direction of double arrow B. Neither of the apertures 18a and 18b reaches the optical axis when so moved.

The beam from the particular stop of the displacement unit 13 of the measuring field stop passes through aperture 18a and on to reflex mirror 15, whence it reaches ocular 10. If the slider were in its other end position, then the beam from the measuring field stop would pass through aperture 18b and then on to the photodetector 14 mounted behind aperture 18b.

The apparatus functions as follows: when an integrated measurement is desired, viewing along the direction of measurement is unnecessary because the brightness of the entire object field is being measured anyway. In such a case only the displacement unit 13 for the measuring field stops need be moved so that the larger stop 13b is in the path of the beam, and slider 18 need only be displaced so that the photo-detector 14 also is located in the path of the beam, and that deflecting mirror 12 is in a middle position. Viewing the object then takes place simply through ocular 5.

If on the other hand the brightness of a particular detail of the object is determinant for the exposure time, then the detail or spot measurement must be carried out. This requires first to displace slider 18 so that aperture 18a and reflex mirror 15 are in the path of the beam. Furthermore the displacement unit 13 for the measuring field stops must be moved into that position for which the small stop 13a is on the optical axis. As already described, this small stop 13a may be varied in shape and size and adapted to the selected image detail.

Thereafter deflecting mirror 12 must be tilted, object image 19 being guided across the measuring field stop until the desired object detail appears in stop 13a. This adjustment process may be viewed through reflex mirror 15 in ocular 10.

A rod with ball-head 12a mounted to the mirror is shown in the present embodiment as the means for actuating the tilting of deflecting mirror 12. However the rod and the ball-head are shown only symbolically for any arbitrary drive mechanism suitable for the purpose, namely to achieve the controlled tilting of the mirror.

As already mentioned, electrical actuating means may also be used to tilt the mirror, for instance such as are controlled by a microprocessor. Such a microprocessor may also control a luminous display showing in the field of view 5a of ocular 5 that detail which for the particular position of deflecting mirror 12 is just being reproduced in aperture 13a.

These displacement and viewing mechanisms are not part of the conception of the present invention per se, which solely consists in keeping fixed both the object and the measuring field stop and in displacing instead the image of the object across the measuring field stop.

Once it has been determined by viewing that the important object detail appears in stop 13a, slider 18 must be moved so that now the photo-detector 14 will be on the optical axis 17. Thereupon the measurement of brightness is carried out and the exposure time so determined can then be set at the shutter 8. Obviously the magnitude provided by the photo-detector can also be used directly for automatic control of shutter 8.

Figure 3:
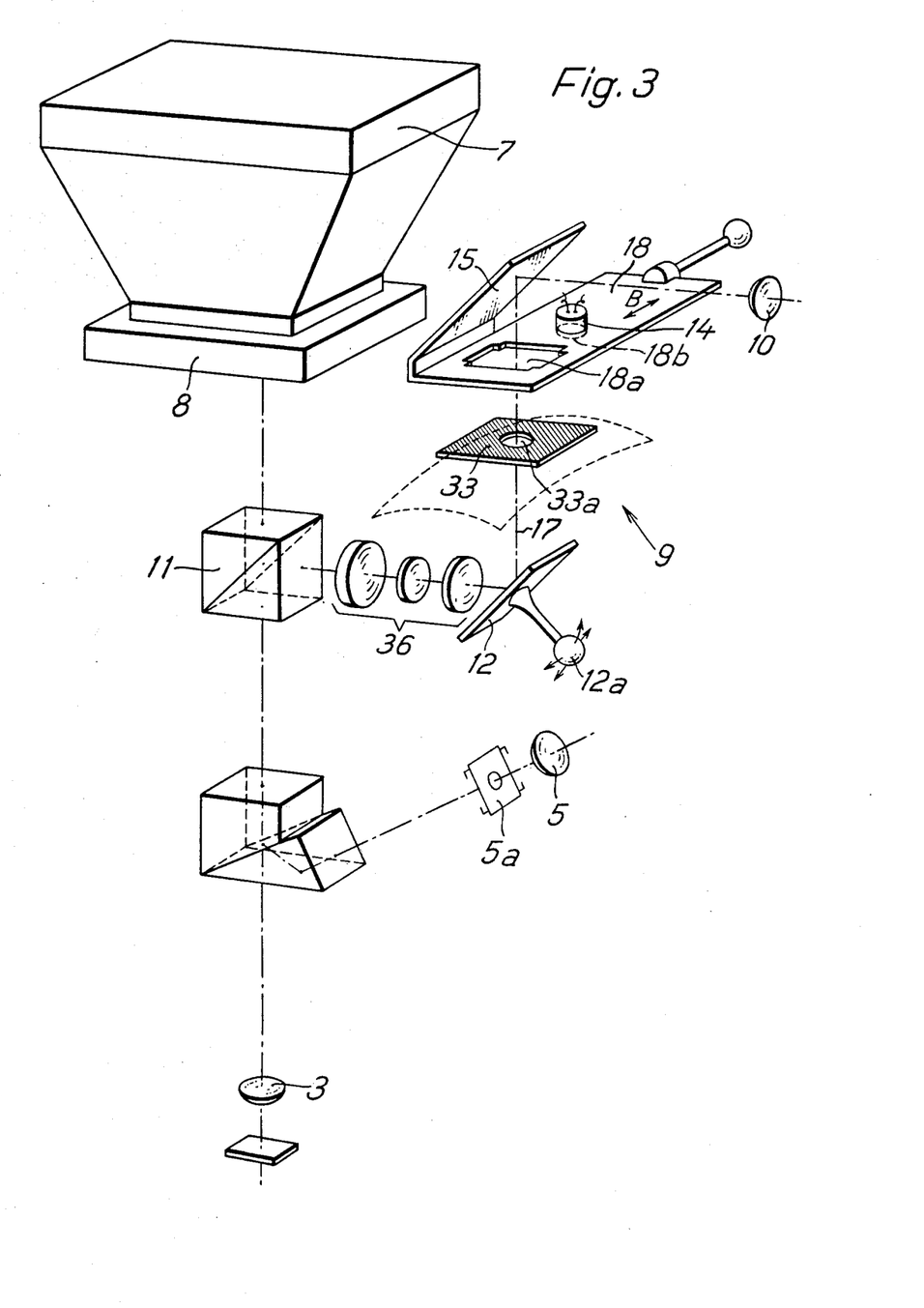
FIG. 3 shows a modification of FIG. 2 with a zoom-lens in the path of the measuring beam.

The same reference numerals used in FIG. 2 apply in FIG. 3 to those components already present in FIG. 2. FIG. 3 shows an embodiment in which the measuring field stop 33 is fixed in position and in which the transition between spot and integrated measurements may be carried out continuously using a zoom lens 36 mounted between beam-splitter 11 and deflecting mirror 12 and replacing the lens system 16 of FIG. 2.

Figure 4:
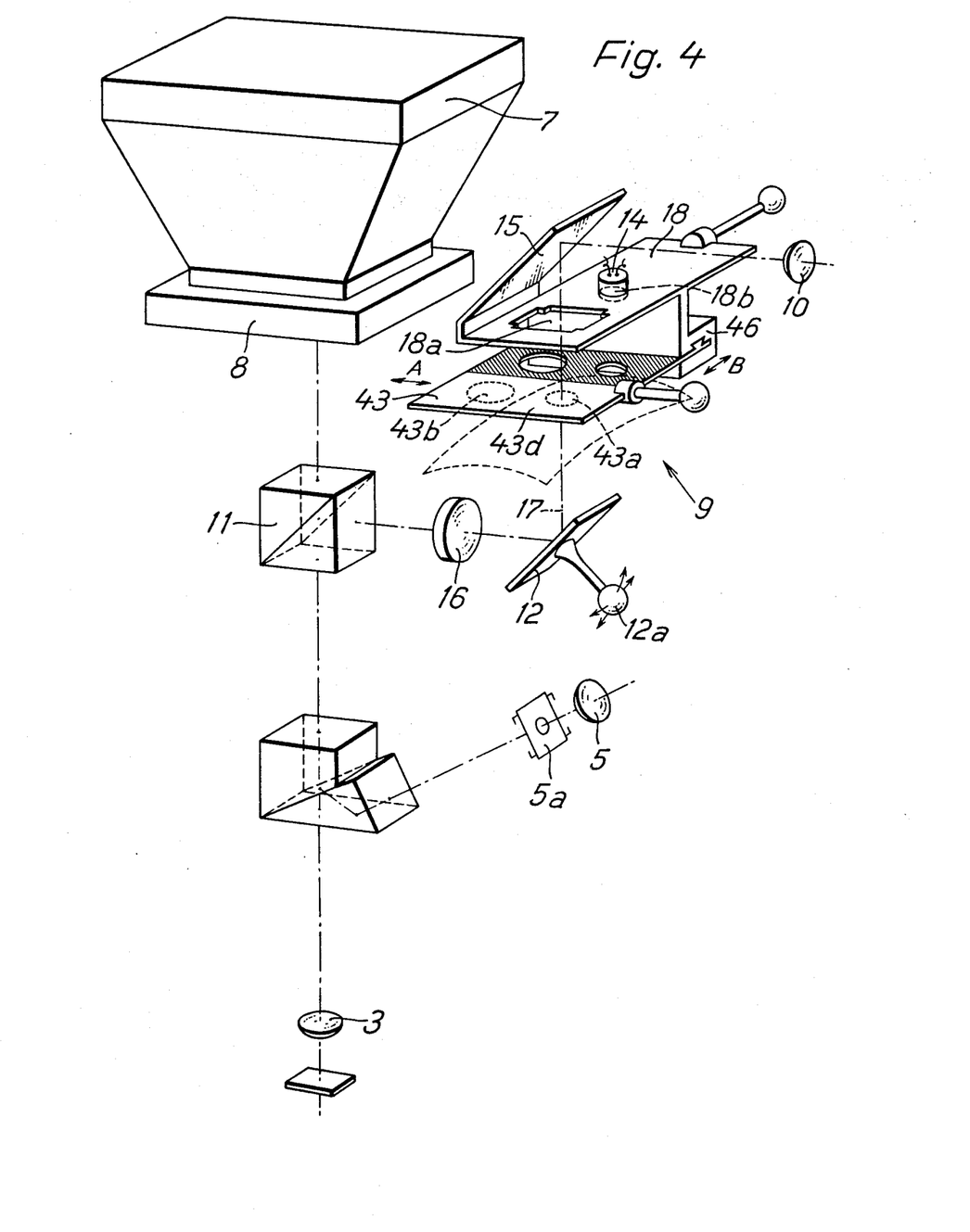
FIG. 4 shows a modification of FIG. 2 with a stop displacing unit connected to a transparent support.

FIG. 4 shows an embodiment in which an overview of the entire object is obtained prior to performing a spot measurement. To that end the measuring field stop 43 is rigidly connected with a transparent support plate 43d of about the same size and marked with the aperture-sizes of the detail stop 43a and the integrating stop 43b. Measuring field stop 43 and support plate 43a, since they are rigidly connected, may be displaced not only in the direction of double arrow A but also in that of double arrow B for viewing and measurement, whereby the transparent support plate is located in the path of the beam during viewing.

Prior to the "viewing" and "measuring" procedures, the measuring field stop and the support plate must be displaced along the direction of arrow B in the same manner as slider 18. On that account this slider 18 and the unit consisting of the measuring field stop and the support plate are connected together. This connection is implemented by a guide-strip 46 within which the unit of measuring field stop and support plate may also be displaced in the direction of arrow A with respect to slider 18.

Figure 5:
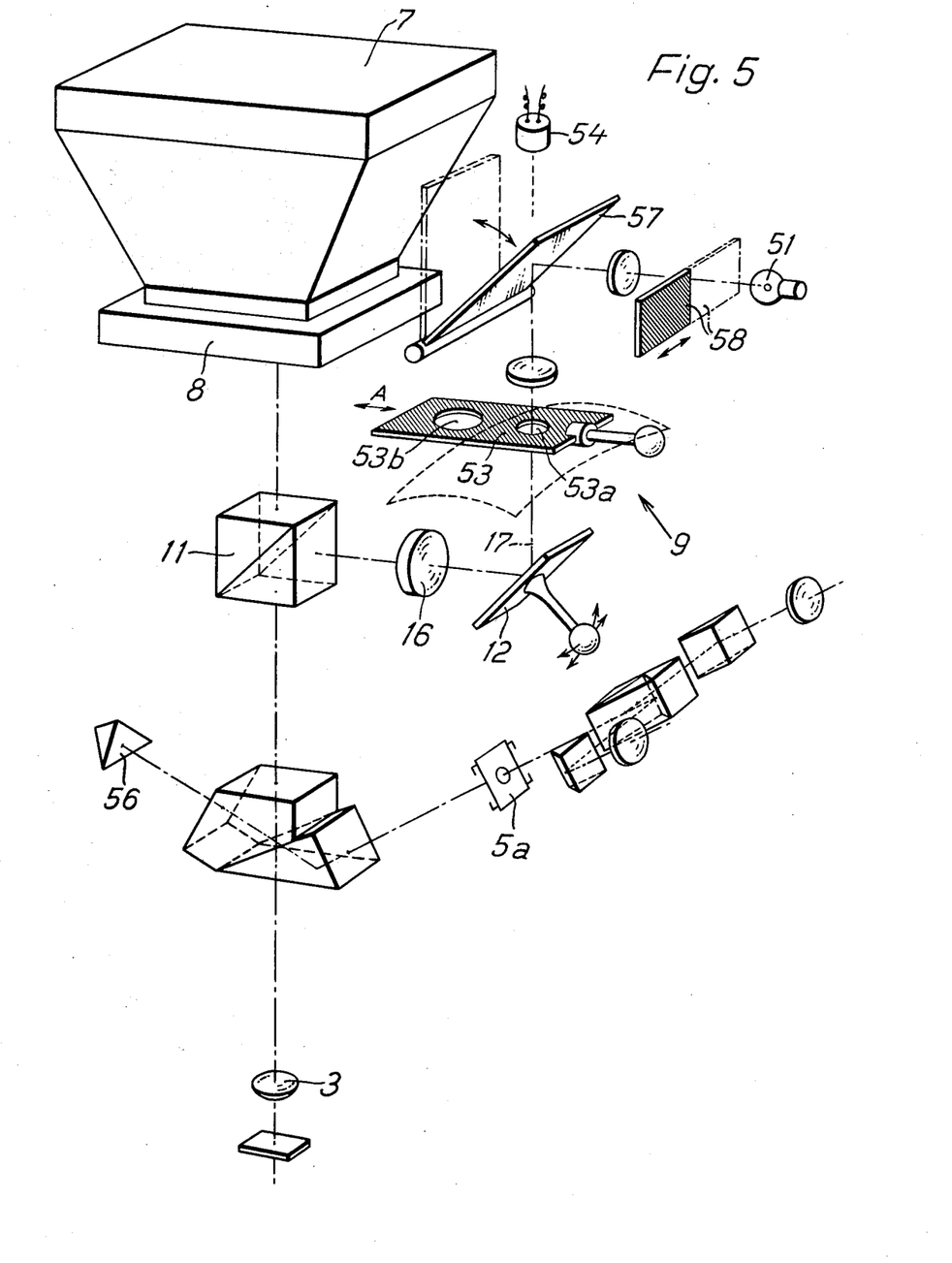
FIG. 5 is a perspective showing of an embodiment in which the position of the detail within the overall objective is made visible by mirroring back the measuring field stop into the binocular tube.

FIG. 5 shows an embodiment in a similar vein, wherein the overview of the entire object is retained, for the case of viewing prior to a spot measurement. This is achieved in this embodiment by reflecting a stop image back into the binocular tube. To that end, the stop slider 53 is quasi-illuminated from the rear by a special light source 51 by means of a tilting mirror 57 with an excursion less than 45° and located between stop 53 and photo-detector 54. Because of this illumination, stop 53a or 53b is reflected by means of deflection mirror 12 and beam splitter 11 into the prism of the binocular tube and then it passes to a triple mirror 56 and from there back into the field of view 5a of ocular 5.

The entire object being visible in this field of view, the particular detail being measured is especially emphasized by the special illumination. Here again the desired detail is selected by tilting deflection mirror 12.

Illumination therefore requires no more than tilting the mirror 57. Thereupon the measuring beam tapped at beam splitter 11 reaches the photo-detector 54 unhampered and thus determines the length of exposure. It is appropriate to cover light source 51 by a slider 58 during exposure so that no spurious light from it can fall on the photo-detector.

Figure 6:
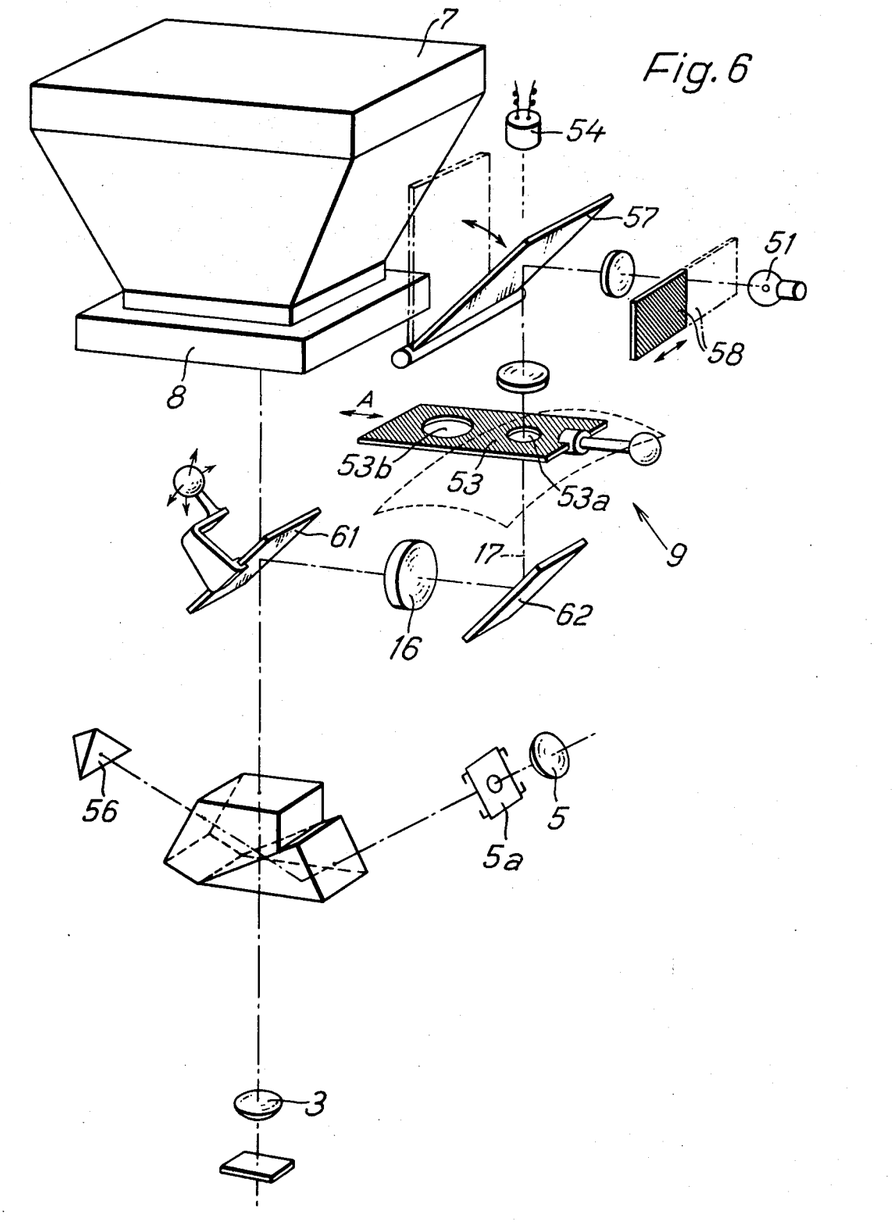
FIG. 6 is another embodiment of FIG. 5 in which the beam-splitter is gimbal-suspended in the picture-taking beam itself.

Lastly FIG. 6 shows another embodiment in which the gimbal-suspended reflection means is the beam-splitter 61 itself, which perforce is located in the picture-taking beam anyway. On that account, deflection mirror 62 is fixed in position.

It is especially emphasized that this embodiment, namely the gimbal-suspension of beam-splitter 61 in the picture-taking beam applies to more than the design otherwise incorporating the features shown in FIG. 5, and can be combined with all the other characteristics described above. For other designs, furthermore, deflection mirror 62 may be omitted entirely.

We claim:

1. Photomicrographic exposure meter for a camera attached to a microscope comprising optical means defining a picture-taking beam for microscopic examination of an object positioned on a stage, a beam-splitter located along said picture taking beam and reflecting a part of the picture-taking beam, said part of the picture taking beam projecting an image of said object onto an image plane, a measuring field stop with an aperture for detail or spot measurements located in said image plane, an insertable photo-electric detector positioned downstream of said stop in the direction of and along said part of the picture taking beam, at least one specular means (12,61) reflecting said part of the picture taking beam to said measuring field stop (13), a gimbal suspension for said specular means, means for displacing said gimbal-suspended specular means (12,61) and means for viewing said object detail appearing in said stop aperture.

2. The photomicrographic exposure meter of claim 1, wherein said specular means is a beam-splitter (61) in the path of said picture-taking beam.

3. The photomicrographic exposure meter of claim 1, wherein said specular means is a deflecting mirror (12) in the path of a measuring beam positioned between said beam-splitter (11) which is fixed and said measuring field stop (13).

4. The photomicrographic exposure meter of claim 1, wherein a manually actuated drive or gearing (12a) is provided to adjust said specular means (12,61).

5. The photomicrographic exposure meter of claim 1, wherein an electrically operating displacement means is used to adjust said specular means (12,61).

6. The photomicrographic exposure meter of claim 5, wherein said electrical displacing means are controlled by a microprocessor.

7. The photomicrographic exposure meter of claim 6, wherein a luminous display is used for viewing, which marks a point in the visually observed object image (5a) that is proportionately controlled by said microprocessor through said deflection mirror (12).

8. The photomicrographic exposure meter of claim 1, wherein a reflex mirror (15) is mounted behind said measuring field stop for viewing the object detail appearing in the stop aperture and for allowing a view of said stop (13a) when said photoelectric detector (14) is withdrawn from the path of said beam part.

9. The photomicrographic exposure meter of claim 8, wherein said reflex mirror (15) and said photoelectric detector (14) are mounted on a common slider (18).

10. The photomicrographic exposure meter of claim 1 wherein a displacement unit (13) of said measuring field stop in addition to said stop (13a) for the detail or spot measurement is provided with a second larger stop (13b) for integrated measurement and which is displaceable between two positions in which either said stop (13a) or said second stop (13b) is in the path of said beam part.

11. The photomicrographic exposure meter of claim 10, wherein said stop for detail or spot measurements (13a) varies in shape and size and in that means for keeping constant the effect of the stop magnitude on exposure measurement are provided.

12. The photomicrographic exposure meter of claim 10 wherein said measuring field stop (43) is rigidly connected with a transparent support plate (43d) provided with markings (43a, 43b) the size of said stop and said second stop and which can be placed into the path of the measuring beam during viewing.

13. The photomicrographic exposure meter of claim 1, wherein a zoom lens (36) is mounted in the path of said beam part in front of said measuring field stop (33).

14. The photomicrographic exposure meter of claim 1, wherein a light source (51) is provided which illuminates from the rear said measuring field stop (53) during viewing, and in that additional reflecting means (56) are provided which project an image of said stop into the field of view (5a) of an ocular (5).

15. The photomicrographic exposure meter of claim 14, wherein said additional reflecting means is a triple mirror (56) which reflects the beam leaving sideways the prism of the binocular tube back into same and into the ocular field of view (5a).

* * * * *